US012742970B2

(12) United States Patent
Liu et al.

(10) Patent No.: US 12,742,970 B2
(45) Date of Patent: Sep. 22, 2026

(54) OPTICAL SYSTEM AND HEAD MOUNT DISPLAY

(71) Applicant: Goertek Optical Technology Co., Ltd., Shandong (CN)

(72) Inventors: Fenglei Liu, Shandong (CN); Chun Yang, Shandong (CN); Bogang Zhao, Shandong (CN); Shouyan Hu, Shandong (CN)

(73) Assignee: Goertek Optical Technology Co., Ltd., Weifang (CN)

(*) Notice: Subject to any disclaimer, the term of this patent is extended or adjusted under 35 U.S.C. 154(b) by 321 days.

(21) Appl. No.: 18/681,347

(22) PCT Filed: Nov. 29, 2021

(86) PCT No.: PCT/CN2021/133798
§ 371 (c)(1),
(2) Date: Feb. 5, 2024

(87) PCT Pub. No.: WO2023/010723
PCT Pub. Date: Feb. 9, 2023

(65) Prior Publication Data

US 2024/0337848 A1 Oct. 10, 2024

(30) Foreign Application Priority Data

Aug. 4, 2021 (CN) ......................... 202110895050.0

(51) Int. Cl.

| | |
|---|---|
| ***G02B 27/01*** | (2006.01) |
| ***G02B 27/00*** | (2006.01) |
| ***G02B 27/09*** | (2006.01) |

(52) U.S. Cl.
CPC ..... *G02B 27/0172* (2013.01); *G02B 27/0068* (2013.01); *G02B 27/0955* (2013.01)

(58) Field of Classification Search
CPC ............ G02B 27/0172; G02B 27/0068; G02B 27/0955; G02B 27/283; G02B 27/01
See application file for complete search history.

(56) References Cited

U.S. PATENT DOCUMENTS

2017/0010465 A1* 1/2017 Martinez ................ G02C 11/10

FOREIGN PATENT DOCUMENTS

CN 202948204 U 5/2013
CN 103728728 A 4/2014

(Continued)

*Primary Examiner* — James A Dudek
(74) *Attorney, Agent, or Firm* — Baker Botts, L.L.P.

(57) ABSTRACT

The present disclosure provides an optical system and a head mount display, the optical system comprises: a first lens with a first surface and a second surface provided oppositely, the first lens comprising a light input-coupling end-face connected with the first surface and the second surface; a polarizing reflector disposed at a side of the first lens away from the light input-coupling end-face; a beam splitter disposed on a side where the second surface of the first lens is located; a second lens disposed between the beam splitter and the first lens; and a phase retarder disposed on the beam splitter or on the second lens, comprising a body and an extension, the body being disposed corresponding to a middle region of the beam splitter, the extension extending from the body toward an outer edge of the beam splitter, and an outer edge of the extension being aligned with the outer edge of the beam splitter.

10 Claims, 4 Drawing Sheets

(56) References Cited

FOREIGN PATENT DOCUMENTS

| | | | |
|---|---|---|---|
| CN | 104698588 | A | 6/2015 |
| CN | 106164745 | A | 11/2016 |
| CN | 207281388 | U | 4/2018 |
| CN | 109154431 | A | 1/2019 |
| CN | 110045503 | A | 7/2019 |
| CN | 112051671 | A | 12/2020 |
| CN | 113671709 | A | 11/2021 |

* cited by examiner

OPTICAL SYSTEM AND HEAD MOUNT DISPLAY

CROSS-REFERENCE TO RELATED APPLICATIONS

This application is a National Stage of International Application No. PCT/CN2021/133798, filed on Nov. 29, 2021, which claims priority to Chinese Patent Application No. 202110895050.0, filed on Aug. 4, 2021, both of which are hereby incorporated by reference in their entireties.

TECHNICAL FIELD

The present disclosure relates to the field of optical display technology, and in particular to an optical system and a head mount display.

BACKGROUND

A head mount display (HMD) provides an immersive virtual picture experience for a user. In order to reduce the size of the head mount display, an optical path with multiple turns is adopted for reducing the thickness of the head mount display. In order to ensure successful completion of multiple turns of an optical path, the head mount display is provided with a light-splitting device with a certain focal power. In addition, in order to ensure that the external light can be transmitted into the head mount display, the head mount display is also provided with a compensation device to compensate for the focal power of the light-splitting device. However, there exists a seam where an outer edge of the compensation device docks with that of the light-splitting device, where light is deflected or scattered as it passes through this seam. This splicing seam between the compensation device and the light-splitting device is visible to the user when the user is wearing the head mount display, and therefore, when the user is viewing the picture, light deflected by the seam influences the imaging effect of the picture.

SUMMARY

In view of the above, aiming at the problem that the light deflected by the seam influences the imaging effect of the picture when the user wears the head mount display due to existence of a seam where an outer edge of the compensation device docks with that of the light-splitting device in the head mount display, it is necessary to provide an optical system and a head mount display intended for avoiding occurrence of the seam and ensuring the imaging effect of the head mount display.

To achieve the above objective, the present disclosure proposes an optical system, comprising:

- a first lens with a first surface and a second surface provided oppositely, the first lens comprising a light input-coupling end-face connected to the first surface and the second surface;
- a polarizing reflector provided on a side of the first lens distal to the light input-coupling end-face, light being incident into the first lens from the light input-coupling end-face and reflected to the polarizing reflector via at least one of the first surface and the second surface;
- a beam splitter lens provided on a side where the second surface of the first lens is located;

- a second lens being a compensating lens, provided between the beam splitter lens and the first lens, and configured to compensate for focal power of the beam splitter lens; and
- a phase retarder provided on the beam splitter lens or on the second lens, comprising a body and an extension, the body being provided corresponding to a central region of the beam splitter lens, the extension extending from the body toward an outer edge of the beam splitter lens, and an outer edge of the extension being aligned with the outer edge of the beam splitter lens.

Optionally, the optical system further comprises a correcting lens configured to correct aberration of an external light and provided on a side of the first lens distal to the light input-coupling end-face, the polarizing reflector provided between the first lens and the correcting lens.

Optionally, the correcting lens comprises a third surface and a fourth surface provided oppositely, the third surface being co-planar with the first surface, and the fourth surface being co-planar with the second surface.

Optionally, the second surface of the first lens comprises a first endpoint connected to the light input-coupling end-face, the fourth surface of the correcting lens comprises a second endpoint distal to the first endpoint, one end of the outer edge of the beam splitter lens is aligned with the first endpoint and the other end of the outer edge of the beam splitter lens is aligned with the second endpoint.

Optionally, the polarizing reflector is a polarization-reflecting film provided on the correcting lens and glued to the first lens.

Optionally, the phase retarder is provided on the beam splitter lens which is glued to the second lens, the second lens being spaced from the first lens.

Optionally, the beam splitter lens comprises a plane-concave lens whose concave surface faces toward the second lens, and a beam splitting film provided between the phase retarder and the concave surface of the plane-concave lens.

Optionally, the second lens is a plane-convex lens with a convex surface facing toward the beam splitter lens and a planar surface facing away from the beam splitter lens.

Optionally, the first surface and the second surface are provided parallel to each other.

In addition, for solving the above problem, the present disclosure further provides a head mount display comprising a display and the above optical system, and the display is provided on a light input-coupling end-face of the first lens.

In the technical solution proposed by the present disclosure, the light enters into the first lens from the light input-coupling end-face, is totally reflected between the first surface and the second surface, and is transmitted into the polarizing reflector. When the light is first incident into the polarizing reflector, the polarization direction of the light is orthogonal to the transmission axis direction of the polarizing reflector, and the light is reflected to the second surface. After the light is transmitted out of the first lens, it passes through the phase retarder and is converted into the circularly polarized light. Further, the light is reflected after passing through the beam splitter lens, and thus the polarization handedness of the circularly polarized light changes from left-handed rotation to right-handed rotation or from right-handed rotation to left-handed rotation. After the light passed through the phase retarder again, it is converted from a circularly polarized state to a linearly polarized state, and when the linearly polarized light is incident into the polarizing reflector for the second time, the polarization direction of the light is the same as the transmission axis direction of the polarizing reflector and the light is transmitted through the first lens into the human eyes. Here, the second lens serves to compensate the focal power of the beam splitter lens. If the focal power of the beam splitter lens is positive, the focal power of the second lens is negative; otherwise, if the focal power of the beam splitter lens is negative, the focal power of the second lens is positive. By aligning the outer edge of the extension with the outer edge of the beam splitter lens, there is no docking seam left therebetween at their outer edges, and thus no scattering of the light. Accordingly, there is no seam visible to the user when the user is wearing the head mount display, thus ensuring the normal display of the display screen.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DESCRIPTION OF REFERENCE SIGNS

Figure 1:
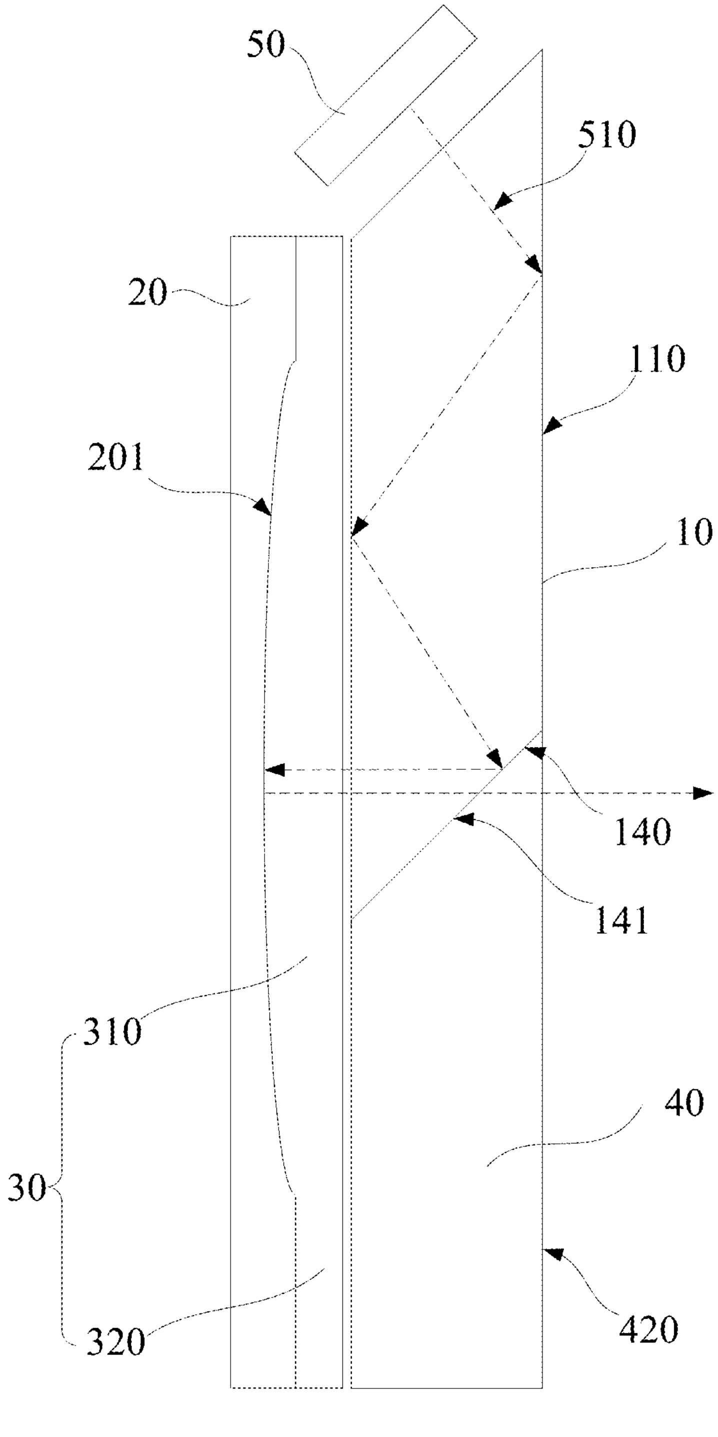
FIG. 1 is a schematic structural illustration of an optical system according to an embodiment of the present disclosure.

| | | | |
|---|---|---|---|
| 10 | first lens | 320 | extension |
| 110 | first surface | 40 | correcting lens |
| 120 | second surface | 410 | second glued end-face |
| 121 | first endpoint | 420 | third surface |
| 130 | light input-coupling end-face | 430 | fourth surface |
| 140 | first glued end-face | 431 | second endpoint |
| 20 | beam splitter lens | 50 | display |
| 30 | second lens | 510 | light |
| 310 | body | | |

The implementation of the objects, functional features and advantages of the present disclosure will be further described in connection with the embodiments, with reference to the accompanying drawings.

DETAILED DESCRIPTION

Technical solutions in the embodiments of the present disclosure are described below with reference to the accompanying drawings in the embodiments of the present disclosure. Apparently, the described embodiments are merely some rather than all of the embodiments of the present disclosure. Any other embodiment acquired by those of ordinary skill in the art based on the embodiments of the present disclosure without any creative work, shall fall into the protection scope of the present disclosure.

It should be noted that all directional indications (such as up, down, left, right, front, back . . . ) in the embodiment of the present disclosure are used only to explain the relative positional relationship, movement, etc., between the parts in a particular attitude (as shown in the accompanying drawings), and the directional indications change accordingly in the case that particular attitude changes.

In addition, terms "first" and "second" involved in the present disclosure are only used for descriptive purposes and should not be understood as indicating or implying relative importance or implying a number of indicated technical features. Therefore, a feature delimited with "first", "second" may expressly or implicitly include at least one of those features. In a description of the present disclosure, "a plurality" means at least two, such as two, three, etc., unless expressly and specifically defined otherwise.

In the present disclosure, unless expressly specified and limited otherwise, terms "connected", "fixed" and other terms should be interpreted in a broad sense, for example, "fixed" can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present disclosure can be understood according to specific situations.

In addition, the technical solutions between the various embodiments of the present disclosure may be combined with each other, but it must be based on the fact that it can be realized by a person of ordinary skill in the art. When the combination of technical solutions appears to be contradictory or unattainable, it should be considered that such combination of technical solutions does not exist and is not within the scope of protection claimed in the present disclosure.

Figure 3:
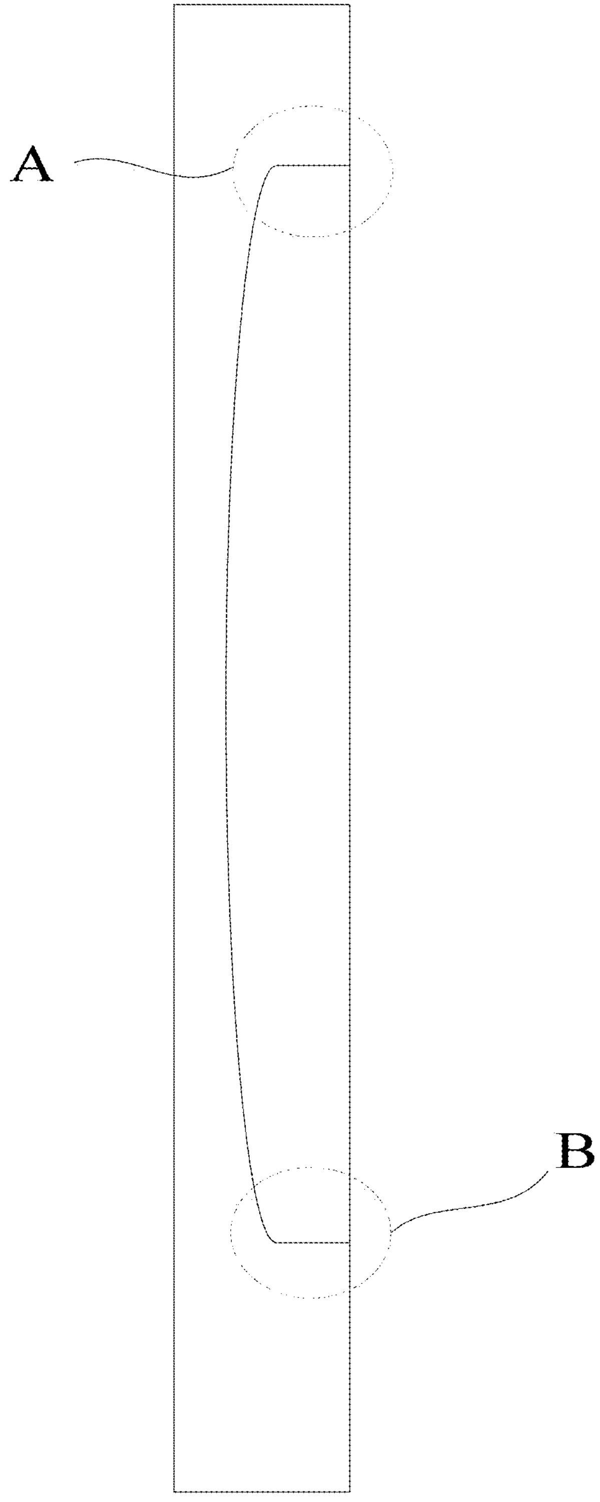
FIG. 3 is a schematic structural illustration of a location of a docking seam in the related art.
Figure 4:
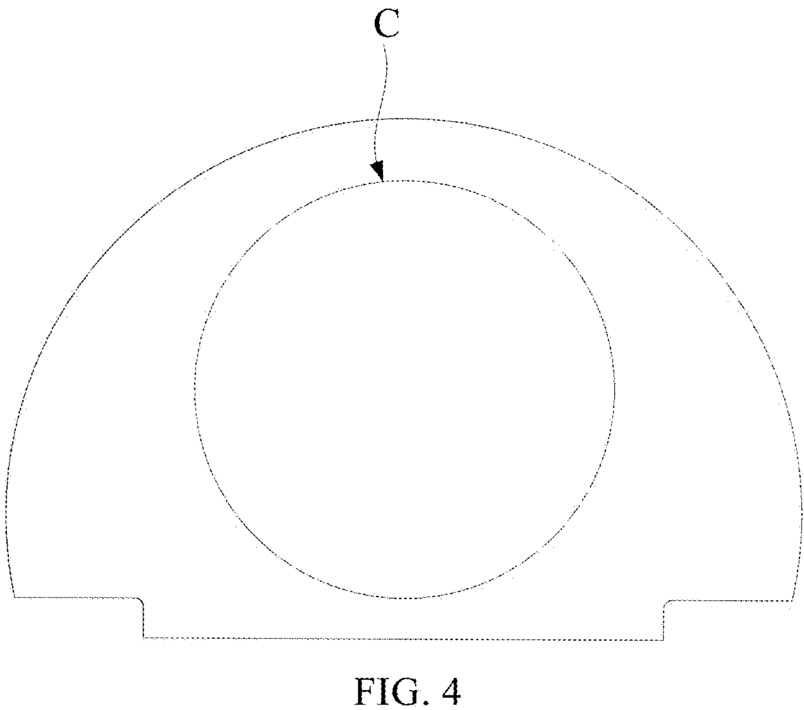
FIG. 4 is a schematic illustration of an effect of the docking seam of FIG. 3.

In the related art, as shown in FIG. 3, the outer edges of the compensation device and the light-splitting device are docked at positions A and B, and there is a seam therebetween. The light is deflected or scattered as it passes through this seam. Referring to FIG. 4, the splice seam C of the two is visible to the user when he or she wearing the head mount display, and when the compensating device is of circular structure, the splice seam occurred is also circular. When the user is viewing the picture, the light deflected by the seam influences the imaging effect of the picture.

Figure 2:
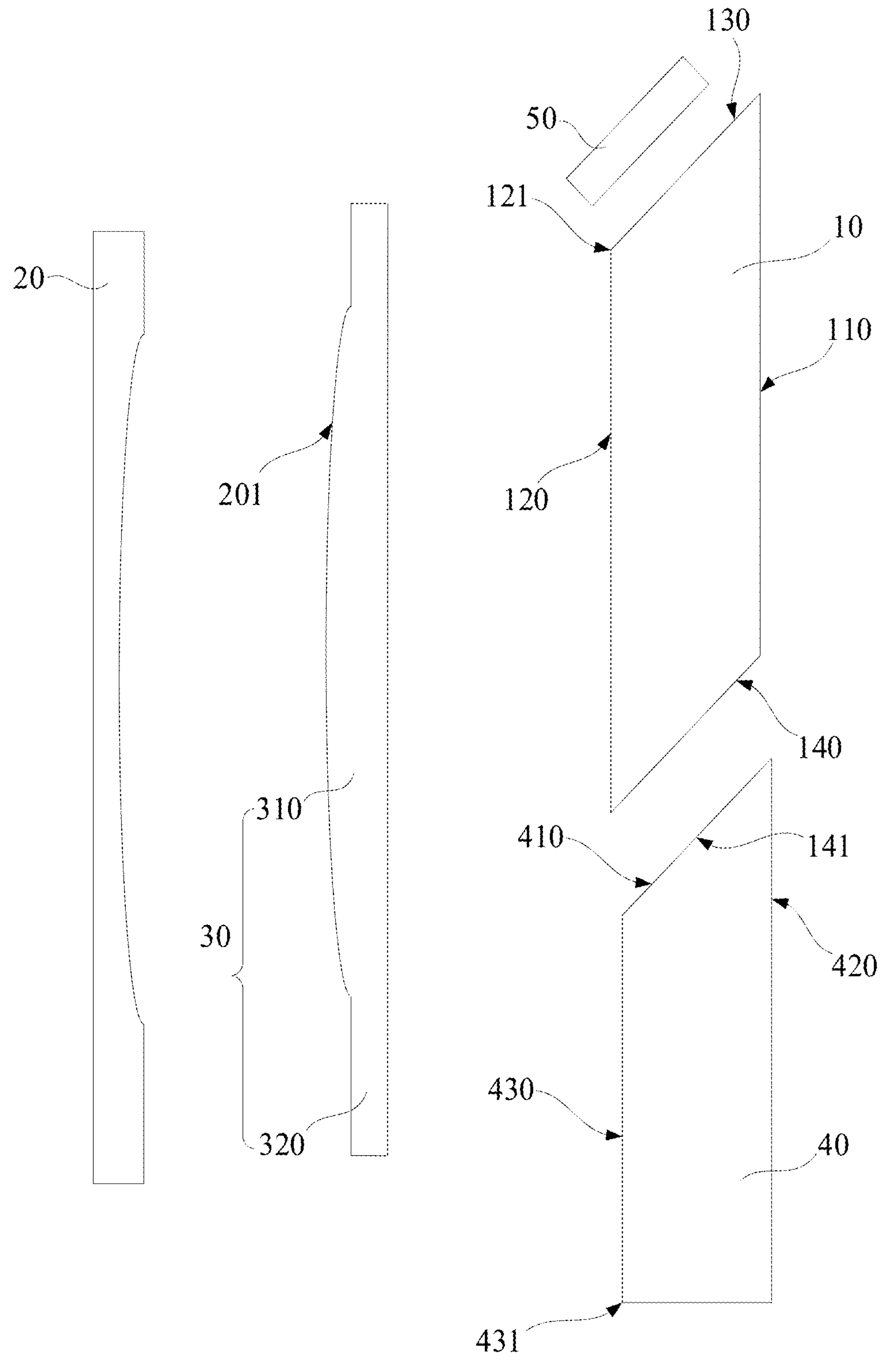
FIG. 2 is a schematic illustration of an exploded structure of the optical system of FIG. 1.

In order to solve the above problem, referring to FIGS. 1 and 2, the present embodiment provides an optical system, comprising: a first lens 10, a beam splitter lens 20, a second lens 30, a phase retarder 201, and a polarizing reflector 141.

The first lens 10 comprises a first surface 110 and a second surface 120 provided oppositely. The first lens 10 comprises a light input-coupling end-face 130 connected to the first surface 110 and the second surface 120. Light 510 is incident into the first lens 10 from the light input-coupling end-face 130, i.e., is transmitted into an optically thinner medium from an optically denser medium with an incident angle greater than or equal to a total reflection critical angle, and satisfies a total reflection condition of the light at the first surface 110. The light 510 is reflected by the first surface 110 toward the second surface 120. Likewise, the light 510 also satisfies the total reflection condition of the light at the second surface 120, and is reflected again by the second surface 120. Here, the first lens 10 may be understood as a waveguide structure.

The polarizing reflector 141 is provided on a side of the first lens 10 distal to the light input-coupling end-face 130.

The light 510 is incident into the first lens 10 through the light input-coupling end-face 130, and is reflected to the polarizing reflector 141 via at least one of the first surface 110 and the second surface 120; wherein, the first lens 10 has a first glued end-face 140 provided on a side of the first lens 10 distal to the light input-coupling end-face 130, and the polarizing reflector 141 may be provided on the first glued end-face 140 (as shown in FIG. 1) or spaced apart from the first glued end-face 140.

The beam splitter lens 20 is provided on a side where the second surface 120 of the first lens 10 is located; the beam splitter lens 20 functions to split the incident light 510, for example, to reflect a part of the light 510 and transmit the other part of the light 510. The ratio of reflected to transmitted is adjustable, which may be 1:2, 1:1, or 2:1, etc.

The second lens 30 is provided between the beam splitter lens 20 and the first lens 10, is a compensating lens, and is configured to compensate for focal power of the beam splitter lens 20; the optical system in the present embodiment is applied to a head-mounted display whose display principle includes AR (Augmented Reality) display. In the AR display, the internal light 510 needs to be converged or diffused, and thus the beam splitter lens 20 has a certain focal power. Besides, the AR display also requires external light to enter into the interior of the head-mounted display. In order to ensure that the external light can smoothly enter the human eyes in parallel, it is necessary to compensate the focal power of the beam splitter lens 20. The settings between the beam splitter lens 20 and the second lens 30 include a gluing setting and a spacing setting.

A phase retarder 201 may be provided on the beam splitter lens 20, and may also be provided on the second lens 30. Specifically, as shown in FIG. 1, the phase retarder 201 may be located on the beam splitter lens 20, for example, on the concave surface of the plane-concave lens of the beam splitter lens 20, where the concave surface faces the second lens 30. Alternatively, as shown in FIG. 2, the phase retarder 201 may be located on the second lens 30, for example, on the convex surface of the second lens 30, where the second lens 30 is a plane-convex lens with the convex surface facing toward the beam splitter lens 20. The second lens 30 comprises a body 310 and an extension 320. The body 310 is provided corresponding to the central region of the beam splitter lens 20, and the extension 320 extends from the body 310 toward an outer edge of the beam splitter lens 20. An outer edge of the extension 320 is aligned with the outer edge of the beam splitter lens 20. By providing that the outer edge of the extension 320 which is aligned with the outer edge of the beam splitter lens 20, it can be known that the opposite cross-sectional areas of extension 320 and beam splitter lens 20 are equal in size, so as to avoid a situation where the outer edges are not aligned. It may also be understood that the outer edge of extension 320 extends beyond the user's field of view. In other embodiments, the case where the difference in size between the second lens and the beam splitter lens is small is also referred to as "edge alignment", for example, wherein the smaller size is 90% of the larger size. Here, the phase retarder 201 serves to change the polarization state of light 510, for example, to convert linearly polarized light into circularly polarized light, or to convert circularly polarized light into linearly polarized light. The phase retarder 201 is a laminated film structure or a separate device. The phase retarder 201 of the laminated film structure is beneficial to reducing the volume of the whole optical system. Here, the phase retarder 201 comprises a quarter-wave plate.

Figure 5:
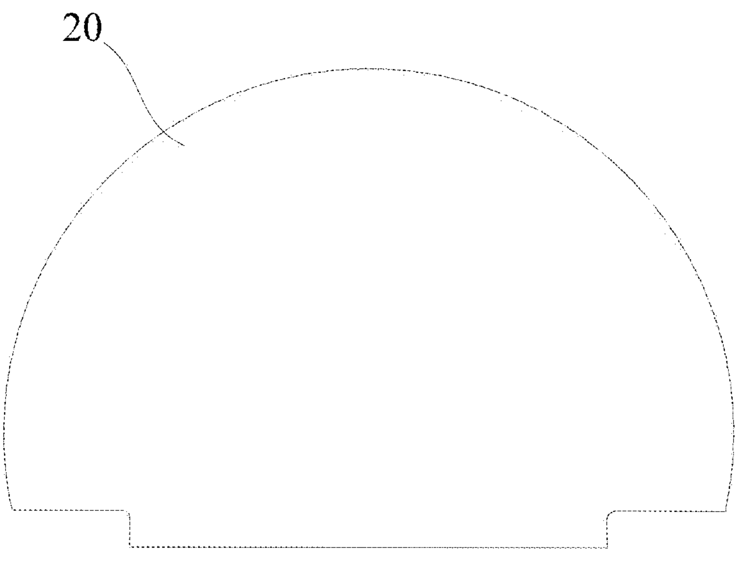
FIG. 5 is a schematic illustration of an effect of the optical system of FIG. 1.

In the technical scheme proposed in the present example, the light 510 enters into the first lens 10 from the light input-coupling end-face 130, is totally reflected between the first surface 110 and the second surface 120, and is transmitted into the polarizing reflector 141. When the light 510 is first incident into the polarizing reflector 141, the polarization direction of the light 510 is orthogonal to the transmission axis direction of the polarizing reflector 141, and the light 510 is reflected to the second surface 120. After the light 510 is transmitted out of the first lens 10, it passes through the phase retarder 201 and is converted into the circularly polarized light. Further, the light 510 is reflected after passing through the beam splitter lens 20, and thus the polarization handedness of the circularly polarized light changes from left-handed rotation to right-handed rotation or from right-handed rotation to left-handed rotation. After the light 510 passes through the phase retarder 201 again, it is converted from a circularly polarized state to a linearly polarized state, and when the linearly polarized light 510 is incident into the polarizing reflector 141 for the second time, the polarization direction of the light 510 is the same as the transmission axis direction of the polarizing reflector 141 and the light 510 is transmitted through the first lens 10 into the human eyes. Here, the second lens 30 serves to compensate the focal power of the beam splitter lens 20. If the focal power of the beam splitter lens 20 is positive, the focal power of the second lens 30 is negative. Otherwise, if the focal power of the beam splitter lens 20 is negative, the focal power of the second lens 30 is positive. By aligning the outer edge of the extension 320 with the outer edge of the beam splitter lens 20, there is no docking seam between the two at the outer edges, so that there is no scattering of the light 510. Referring to FIG. 5, there is no seam visible to the user when the user is wearing the head mount display, thus ensuring the normal display of the display screen.

In one of the embodiments of the present disclosure, when the external light is transmitted to the waveguide structure, lights of different colors will have different refractive indexes, which tends to lead to dispersion that can be understood as chromatic distortion being a kind of aberration. In order to reduce dispersion, the optical system further comprises a correcting lens 40, which is configured to correct the aberration of the external light and is provided on a side of the first lens 10 distal to the light input-coupling end-face 130. The polarizing reflector 141 is provided between the first lens 10 and the correcting lens 40. The correcting lens 40 may be glued onto the first lens 10. For example, the correcting lens 40 has a second glued end-face 410. An optical glue is provided on the second glued end-face 410, so as to glue the second glued end-face 410 of the correcting lens 40 to the first glued end-face 140 of the first lens 10 which are docked, thereby completing the fixation of the correcting lens 40. As shown in FIG. 2, the polarizing reflector 141 may be located on the second glued end-face 410 of the correcting lens 40. It can be understood that the polarizing reflector 141 may also be provided on the correcting lens 40 at this time, may be a polarization-reflecting film attached to the correcting lens or may be a laminated film structure directly plated on the correcting lens.

In the above embodiment, to ensure that the optical system is simple and easy to install, the correcting lens 40 comprises a third surface 420 and a fourth surface 430 provided oppositely, the third surface 420 is co-planar with the first surface 110, and the fourth surface 430 is co-planar with the second surface 120. Therefore, it can be seen that in order to facilitate the alignment when splicing the correcting lens 40 to the first lens 10, the correcting lens 40 and the first lens 10 form an integral structure.

In the above embodiment, to further prevent the outer edges of the beam splitter lens 20 and the second lens 30 from influencing the user's view, the second surface 120 of the first lens 10 comprises a first endpoint 121 connected to the light input-coupling end-face 130, the fourth surface 430 of the correcting lens 40 comprises a second endpoint 431 distal to the first endpoint 121, one end of the outer edge of the beam splitter lens 20 is aligned with the first endpoint 121 and the other end of the outer edge of the beam splitter lens 20 is aligned with the second endpoint 431. It can be seen that the cross-sectional area of a surface of the beam splitter lens 20 or the second lens 30 toward the first lens 10 is equal to the sum of the area of the second surface 120 and that of the fourth surface 430. It can also be understood that the orthogonal projection area of the beam splitter lens 20 or the second lens 30 fully covers the second surface 120 and the fourth surface 430.

In order to ensure smooth turning of the light 510, the polarizing reflector 141 is a polarization-reflecting film provided on the correcting lens 40. The first lens 10 is glued to the correcting lens 40. The polarization-reflecting film has a transmission axis for the light 510, and the light 510 is able to pass through the polarization-reflecting film when the polarization direction of the light 510 is in the same direction as the transmission axis for the light 510, while the light 510 is reflected when the light 510 of the other polarization direction encounters the deflection-reflection film. It should be noted that the light 510 incident into the first lens 10 is the linearly polarized light whose vibration direction is orthogonal to the transmission axis of the light 510 of the polarization-reflecting film. In addition, the polarizing reflector 141 is the laminated film structure, which helps to reduce the size of the optical system.

In one of the embodiments of the present disclosure, to facilitate compactness of the structure, the phase retarder 201 is provided on the beam splitter lens 20, which beam splitter lens 20 is configured to glue to the second lens 30. With gluing, it is possible to effectively reduce the overall volume of the optical system. In addition, the second lens 30 is spaced from the first lens 10, so that an air gap is formed between the second lens 30 and the first lens 10. It is ensured that the light 510 is transmitted from an optically denser medium into an optically thinner medium when the light 510 is incident into the second surface 120, thereby ensuring that the light 510 is totally reflected on the second surface 120.

In the above embodiment, the beam splitter lens 20 comprises a plane-concave lens whose concave surface faces toward the second lens 30, and a beam splitting film (not shown) provided between the phase retarder 201 and the concave surface of the plane-concave lens. As shown in FIG. 1, the phase retarder 201 may be located on the concave surface of the plane-concave lens, with the concave surface facing the second lens 30. The beam splitting film comprises a transflective film. The phase retarder 201 and the beam splitting film may be provided on the beam splitter lens 20 or on the second lens 30. The phase retarder 201 and the beam splitting film may be pasted on the concave surface of the plane-concave lens, and may also be coated. The way of pasting is simple and easy to operate. The way of coating may improve the compactness and firmness of the laminated film.

In addition, the second lens 30 is a plane-convex lens with a convex surface facing toward the beam splitter lens 20 and a planar surface facing away from the beam splitter lens 20. As shown in FIG. 2, the phase retarder 201 may be located on the convex surface of the plane-convex lens, with the convex surface facing toward the beam splitter lens 20. The phase retarder 201 and the beam splitting film may be provided on the second lens 30. For example, the phase retarder 201 and the beam splitting film may be pasted on the convex surface of the plane-convex lens, and may also be coated. The way of pasting is simple and easy to operate. The way of coating may improve the compactness and firmness of the laminated film.

In another embodiment of the present disclosure, the first surface 110 and the second surface 120 are provided parallel to each other, thereby ensuring that the angle of incidence of the light 510 satisfies the total reflection critical angle when the light 510 is reflected between the first surface 110 and the second surface 120. Besides, the first surface 110 is parallel to the second surface 120, so that the overall structure of the first lens 10 is more compact. In addition, the extension direction of the light input-coupling end-face 130 gradually deviates from the second lens 30. In other words, the angle between the light input-coupling end-face 130 and the first surface 110 is an acute angle, and the angle between the light input-coupling end-face 130 and the second surface 120 is an obtuse angle. Further, the light input-coupling end-face 130 and the first glued end-face 140 are also provided in parallel. It can be seen that the angle between the first glued end-face 140 and the first surface 110 is an obtuse angle, and the angle between the first glued end-face 140 and the second surface 120 is an acute angle.

The disclosure also provides a head mount display comprising a display 50 provided on the light input-coupling end-face 130 of the first lens 10, and the optical system as described above. The light 510 transmitted by the display 50 is the linearly polarized light, and the light 510 in the linearly polarized state is transmitted into the first surface 110 of the first lens 10.

The implementation of the head mount display of the present disclosure may be referred to the various embodiments of the optical system described above, and no further elaboration is needed here.

The above are only preferred embodiments of the present disclosure, and are not intended to limit the patent scope of the present disclosure. Any equivalent structural transformations made by utilizing the specification of the present disclosure and the accompanying drawings under the concept of the present disclosure or direct/indirect application thereof in other related technical fields shall be included in the scope of patent protection of the present disclosure.

The invention claimed is:

1. An optical system, comprising:

a first lens with a first surface and a second surface provided oppositely, comprising a light input-coupling end-face connected to the first surface and the second surface;

a polarizing reflector provided on a side of the first lens distal to the light input-coupling end-face, light being incident into the first lens from the light input-coupling end-face and adapted to be reflected to the polarizing reflector via at least one of the first surface and the second surface;

a beam splitter lens provided on a side where the second surface of the first lens is located;

a second lens comprising a compensating lens, provided between the beam splitter lens and the first lens, and configured to compensate for focal power of the beam splitter lens; and a phase retarder provided on the beam splitter lens or on the second lens, comprising a body and an extension, the body being provided corresponding to a central region of the beam splitter lens, the extension adapted to extend from the body toward an outer edge of the beam splitter lens, and an outer edge of the extension being adapted to be aligned with the outer edge of the beam splitter lens.

2. The optical system according to claim 1, wherein the optical system further comprises a correcting lens configured to correct an aberration of an external light and provided on the side of the first lens distal to the light input-coupling end-face, the polarizing reflector provided between the first lens and the correcting lens.

3. The optical system according to claim 2, wherein the correcting lens comprises a third surface and a fourth surface provided oppositely, the third surface being co-planar with the first surface, and the fourth surface being co-planar with the second surface.

4. The optical system according to claim 3, wherein the second surface of the first lens comprises a first endpoint connected to the light input-coupling end-face, the fourth surface of the correcting lens comprises a second endpoint distal to the first endpoint, one end of the outer edge of the beam splitter lens is aligned with the first endpoint and the other end of the outer edge of the beam splitter lens is aligned with the second endpoint.

5. The optical system according to claim 2, wherein the polarizing reflector is a polarization-reflecting film provided on the correcting lens and glued to the first lens.

6. The optical system according to claim 1, wherein the phase retarder is provided on the beam splitter lens glued to the second lens, the second lens being spaced from the first lens.

7. The optical system according to claim 6, wherein the beam splitter lens comprises a plane-concave lens whose concave surface faces toward the second lens, and a beam splitting film provided between the phase retarder and the concave surface of the plane-concave lens.

8. The optical system according to claim 7, wherein the second lens is a plane-convex lens with a convex surface facing toward the beam splitter lens and a planar surface facing away from the beam splitter lens.

9. The optical system according to claim 1, wherein the first surface and the second surface are provided parallel to each other.

10. A head mount display comprising a display and an optical system according to claim 1, wherein the display being provided on a light input-coupling end-face of a first lens.

* * * * *